Oct. 12, 1954

C. W. LINCOLN ET AL 2,691,308

FOLLOW-UP MECHANISM

Filed March 17, 1953

INVENTORS
Clovis W. Lincoln, &
Philip B. Zeigler
BY
Willits, Helwig & Baillio
ATTORNEYS Oct. 12, 1954  C. W. LINCOLN ET AL  2,691,308
FOLLOW-UP MECHANISM Filed March 17, 1953  3 Sheets—Sheet 3

INVENTORS
Clovis W. Lincoln, &
BY  Philip B. Zeigler
Willets, Helwig & Baillio
ATTORNEYS Patented Oct. 12, 1954

2,691,308

UNITED STATES PATENT OFFICE 2,691,308

FOLLOW-UP MECHANISM

Clovis W. Lincoln and Philip B. Zeigler, Saginaw, Mich., assignors to General Motors Corporation, Detroit, Mich., a corporation of Delaware Application March 17, 1953, Serial No. 342,772

7 Claims. (Cl. 74—388)

This invention concerns a mechanical follow-up mechanism of novel construction and operation. While the mechanism possesses other utility, it is considered especially valuable as applied to the power steering of a motor vehicle and it consequently will be particularly described in that connection.

The power steering of trucks, buses, and heavy off-the-road vehicles has been practiced for some time; indeed in many cases, due to high front end loadings, oversize tires, etc., it is almost essential that the vehicle be so steered, the force required to turn the dirigible wheels, at least when the vehicle is stationary or traveling at low speed, exceeding the strength of many individuals. Recently power steering has been adopted for use in passenger cars and the innovation has been met with wide-spread acceptance, not only because it reduces steering effort, but because in most cases it provides a safety factor, substantially eliminating steering wheel fight or loss of wheel control from tire blow-outs, road bumps and ruts, etc.

In the instance of the smaller cars, particularly, the additional cost of the auxiliary equipment, especially when taken in relation to the over-all cost of the car has been considered objectionable in some quarters. This objection stems from the fact that the apparatuses presently available are hydraulically operated. Thus each necessarily includes four fundamental and fairly expensive components: namely, a reservoir for the fluid medium, a pump drawing from the reservoir, a power cylinder operatively linked to the steering elements, and a valve controlling the flow between the pump and power cylinder. In addition, various fixtures and auxiliary valves are required, not to mention the necessary high pressure connecting lines. The specified major parts, and especially the pump and control valve, must be manufactured to very close tolerances for successful operation, and this, of course, contributes to the cost of the apparatus.

Our invention aims to provide a purely mechanical assemblage which satisfactorily performs the function of the previously proposed hydraulic gears.

Another object is to provide a mechanical gear which is positive in operation, comprises a minimum number of inexpensive parts and is readily assembled and installed.

Another and more specific object is to supply a mechanical gear which is characterized in operation in that the manual effort exerted at the rim of the steering wheel is proportional to the road resistance encountered.

Another specific object is to provide a gear of the type and for the purpose indicated having operating characteristics such that the driver of the vehicle retains a "steering feel."

Still another specific object is to supply a mechanical unit which allows for ordinary manual steering of the vehicle on failure of the source of power.

Additional objects and features of the invention will appear from the following specific description which will proceed with reference to the accompanying drawings illustrating a preferred embodiment of the invention and in which.

Figure 1:
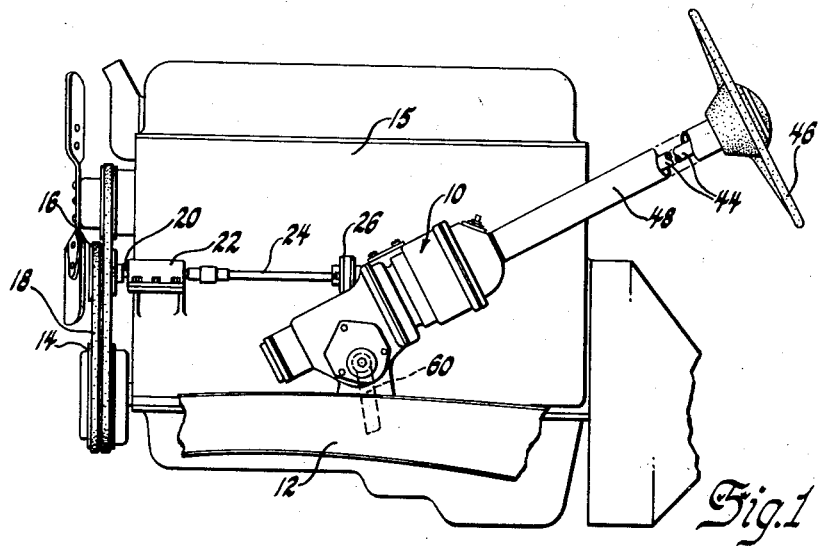
Figure 1 shows the assemblage in association with the power plant and steering gear of an automotive vehicle.
Figure 2:
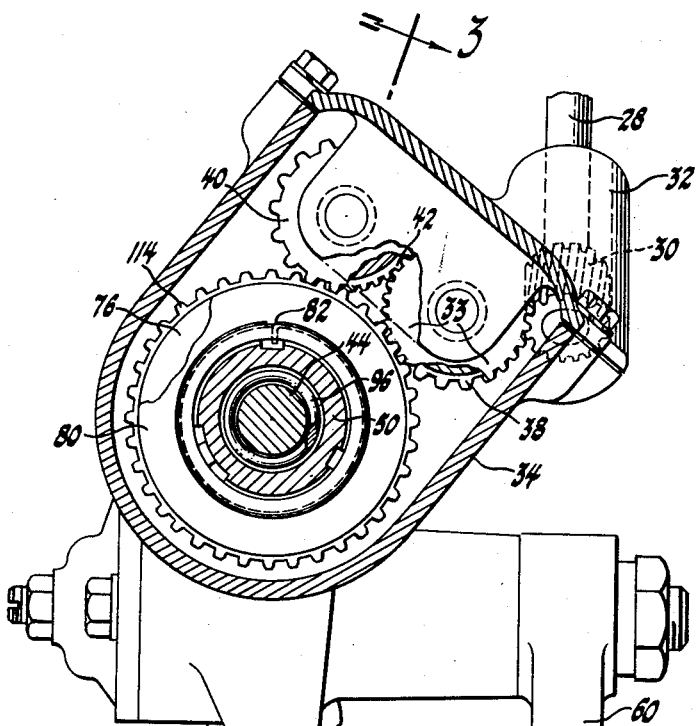
Figure 2 is a section on the line 2—2 of Figure 3.

Referring first to Figure 1, it will be observed that the power steering assemblage 10 is supported with the steering gear from the frame 12 of the vehicle and that it is powered from the crankshaft of the motor 15 by means of pulleys 14 and 16 inter-connected via a belt 18. Pulley 16 is fast on shaft section 20 which extends through a bracket mounting 22 and connects with a shaft section 24 terminating in a free wheel device 26 of conventional construction. Shaft section 28 (Fig. 2) from the opposite side of the free wheel device carries a helical pinion 30 surrounded by a boss 32 forming part of the casing 34 of the assemblage, which should be filled with oil to the extent of about two-thirds of its capacity.

Within the casing 34, the pinion 30 mates with the helical teeth 33 (Fig. 2) of a gear 36, also carrying spur teeth 38. Gear 36 through its helical teeth 33 drives a gear 40 (Fig. 2), which is equipped with the necessary helical teeth 42 and with spur teeth corresponding to teeth 38 of gear 36. The spur tooth portion of the gear 40, which is in fact an exact complement of gear 36, is disposed forwardly of the body of gear 36 having regard to Fig. 2.

With the above arrangement, it will be readily seen that the gears 36 and 40 are constantly rotated by the motor of the vehicle in opposite directions so long as the motor is running. Should the motor fail for any reason, the components of the free wheel 26 become disengaged, enabling hand steering of the vehicle without the necessity of manually turning over the motor.

Figure 3:
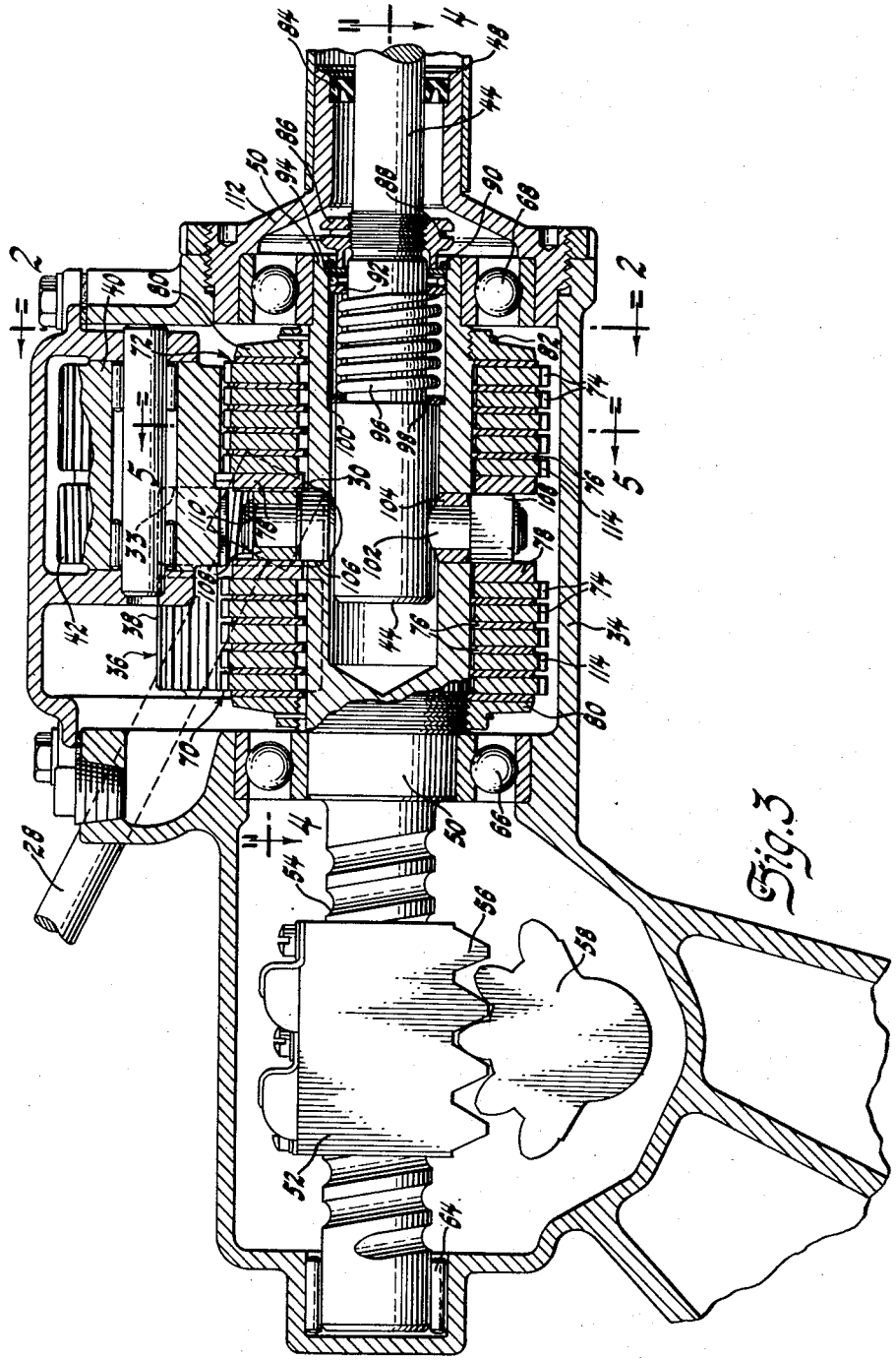
Figure 3 is a longitudinal section on the line 3—3 of Figure 2.

The steering shaft 44 mounts the usual steering wheel 46 and is surrounded by the usual mast jacket 48. This shaft terminates within the casing 34 in a worm-sleeve 50 (Fig. 3), the worm 54 actuating a ball nut 52 of well-known construction and operation. The ball nut has integral teeth 56 through which it mates with a gear sector 58, integral with or fixedly secured to the pitman arm 60 (Fig. 1) which is operatively connected to a drag link, not shown, forming part of a conventional steering linkage. Sleeve 50 turns in cylindrical roller bearings 64 at the lower end of the casing 34 and in spherical roller bearings 66 and 68 located mediately of the length of the sleeve and at the upper end thereof, respectively.

Figure 5:
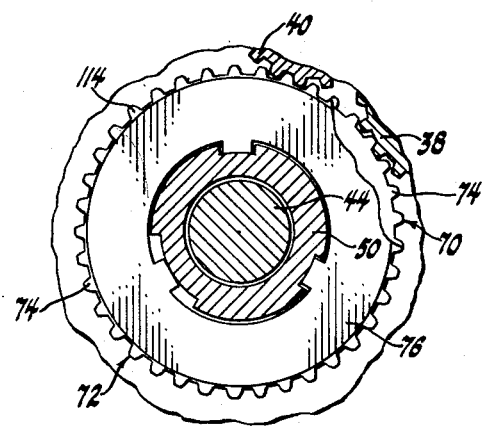
Figure 5 is a section on the line 5—5 of Figure 3.

Between the latter two bearings the sleeve 50 mounts opposed multidisc clutch units 70 and 72, each unit comprising driving discs 74 having peripheral spur teeth 114 and driven discs 76. Driving discs 74 of the lower clutch unit 70 are driven directly by the spur teeth of the gear 36, while the driving discs of the upper clutch unit 72 are driven directly by the spur teeth of the gear 40. The driving discs, of course, are free to rotate on the sleeve 50 when not in engagement with the corresponding driven discs. The driven discs 76 of each unit, on the other hand, are splined to the sleeve (Fig. 5) and hence are incapable of rotating relative thereto, although, like the driving discs, they are axially movable thereon. Also slidable on the sleeve, are thrust collars 78, the purpose of which will later appear. Clutch adjusting plates 80 threaded on the sleeve at either end of the units 70 and 72, taken together, are held in place by lock springs 82. These plates thread in or out as determined by the direction of rotation of the particular unit.

The steering shaft 44 (Fig. 3), which is supported for limited rotary and axial movement relative to the sleeve 50 extends through an oil seal 84 and a nut 86 threaded on the shaft. This nut is retained in position by a suitably anchored lock spring 88 and abuts the outer of a pair of thrust washers 92 providing a race for the balls 94. Also abutting the outer washer is a snap ring 90 received in an annular recess in the sleeve 50. A thrust washer 98 opposite the washers 92 bears on an annular shoulder 100 formed within the sleeve. Thus, the spring 96 surrounding the shaft 44 within the sleeve exerts its outward force against the sleeve in one direction through the washer 98 and in the opposite direction through the parts 92, 94, and 90.

Figure 4:
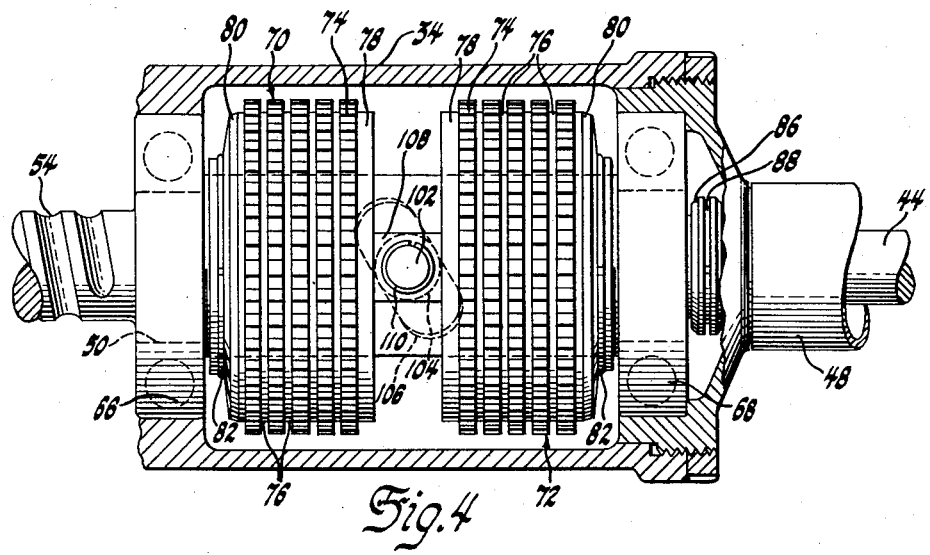
Figure 4 is a section on the line 4—4 of Figure 3.

A pin 102, fast in the steering shaft 44 at the enlarged lower end thereof and positioned between the clutch units, carries a pair of rollers 104, which work in helical slots 106 (Fig. 4) formed in the sleeve 50. Additionally, this pin carries radially outwardly of the rollers 104 a pair of spacer elements 108 which bear against the collars 78. In the particular embodiment the spacer elements are shaped as square blocks, but rollers may be used if desired. The rollers and spacer elements are held on the pin by means of snap rings 110 which fit into annular grooves formed at either end of the pin. It should be apparent that when the steering shaft 44 turns relative to the sleeve 50, as it does when the steering resistance exceeds the integrating force of the spring 96, the shaft is simultaneously caused to move axially in one direction or the other depending on the direction of rotation thereof.

Spring 96 by tending to maintain the shaft and sleeve in a normal neutral or centered relation operates to provide a "steering feel" and prevents a "grabbing" sensation on clutch engagement. The spring is so designed in relation to the spacing of the associated parts as to obtain a predetermined pre-loading. Normally the preloading is equivalent to from two to four pounds of manual steering effort at the rim of the steering wheel. With such a pre-loading, the steering required to keep the vehicle on a straight course may be entirely manual.

Having regard to the operation of the gear, let it be assumed that the vehicle is in motion with the motor running and the steering wheel is rotated clock-wise to make a right turn. The resistance to steering effort being such as to preclude turning of the worm shaft by the steering wheel through the centering spring 96, the worm shaft remains stationary, or essentially so, with the result that the steering shaft is cammed downwardly by force of the pin and slot arrangement, this action being accompanied by compression of the spring through the nut 86 and by engagement of the driving and driven discs of the lower clutch unit 70, the latter occurring as a consequence of pressure applied against the corresponding collar 78 through the spacer elements 108 carried by the pin.

Assuming a left turn, the steering shaft is cammed upwardly rather than downwardly so that the driving and driven discs of the upper clutch unit 72 become engaged and the shaft is powered to the left. In any case, complete steering control is had through the steering wheel at all times, since on release of the manual effort at the steering wheel the shaft and sleeve are substantially instantaneously restored to their normal centered relation by the spring 96, this action necessarily being accompanied by disengagement of the clutch components. The geometry of the steering linkage is no-wise affected by the described gear, hence the normal tendency of the dirigible wheels to assume a straight-ahead position is retained.

We claim:

1. A follow-up mechanism comprising a rotatable working sleeve having associated therewith a pair of opposed clutch units, the driven clutch means of each of said units being adapted for the application of a turning force to said sleeve, power transmission means through which the driving clutch means of said units may be continuously rotated in opposite directions, a control member co-axial with said sleeve and terminating therewithin, said member being supported for simultaneous rotary and axial movement relative to said sleeve, spring means of predetermined loading surrounding said control member within said sleeve tending to resist such movement of said control member and to maintain said sleeve and said member in a normal neutral relation, and means operating to guide and to limit the extent of such movement, said last-mentioned means including means associated with said control member adapted on such movement to cause engagement of the driving and driven clutch means of one or the other of said clutch units as determined by the direction of rotation of said control member.

2. An assemblage for the power steering of a motor vehicle comprising a rotatable worm-bearing shaft operatively connectable to the steering elements of the vehicle and directly mounting a pair of spaced multi-disc clutch units slidable thereon, the driving discs of each of said units being rotatable relative to said shaft, the driven discs being incapable of such relative rotation, power transmission means whereby the driving discs of said units may be continuously rotated in opposite directions through a takeoff from the motor of the vehicle, a steering shaft operatively associated with said worm-bearing shaft and supported for simultaneous rotary and axial movement relative thereto, yieldable means tending to resist such movement of said steering shaft and to maintain said shafts in a normal neutral relation, and means operating to guide and to limit the extent of such movement, said last-mentioned means including means associated with said steering shaft adapted on such movement to cause engagement of the driving and driven discs of one or the other of said clutch units as determined by the direction of rotation of said steering shaft.

3. An assemblage for the power steering of a motor vehicle comprising a rotatable shaft operatively connectable to the steering elements of the vehicle and directly mounting a pair of clutch units slidable thereon, the driving clutch means of each of said units being rotatable relative to said shaft, the driven clutch means of each of said units being incapable of such relative rotation, power transmission means whereby the driving clutch means of said units may be continuously rotated in opposite directions through a take-off from the motor of the vehicle, a steering shaft operatively associated with said first shaft and supported for simultaneous rotary and axial movement relative thereto, yieldable means tending to resist such movement of said steering shaft and to maintain said shafts in a normal neutral relation and means operating to guide and to limit the extent of such movement, said last-mentioned means including means associated with said steering shaft adapted on such movement to cause engagement of the driving and driven clutch means of one or the other of said units as determined by the direction of rotation of said steering shaft.

4. An assemblage for the power steering of a motor vehicle comprising a rotatable worm-bearing sleeve having associated therewith a pair of opposed friction clutch units, the driven clutch means of each of said units being adapted for the transmission of a turning force to said sleeve, power transmission means whereby the driving clutch means of said units may be continuously rotated in opposite directions through a take-off from the motor of the vehicle, a steering shaft co-axial with said sleeve and terminating therewithin, said shaft being supported for simultaneous rotary and axial movement relative to said sleeve, a coil spring of predetermined loading surrounding said shaft within said sleeve tending to resist such movement of said shaft and to maintain said sleeve and said shaft in a normal neutral relation, and means operating to guide and to limit the extent of such movement, said last-mentioned means including means associated with said shaft adapted on such movement to cause engagement of the driving and driven clutch means of one or the other of said clutch units as determined by the direction of rotation of said shaft.

5. An assemblage for the power steering of a motor vehicle comprising a rotatable worm-bearing sleeve having associated therewith a pair of opposed friction clutch units, the driven clutch means of each of said units being adapted for the application of a turning force to said sleeve, power transmission means whereby the driving clutch means of said units may be continuously rotated in opposite directions through a take-off from the motor of the vehicle, said transmission means including a pair of gears each of which comprises helical teeth through which it mates with the other gear and spur teeth through which one of said driving clutch means is driven, a steering shaft co-axial with said sleeve and terminating therewithin, said shaft being supported for simultaneous rotary and axial movement relative to said sleeve, spring means of predetermined loading associated with said sleeve and said shaft tending to resist such movement of said shaft and to maintain said sleeve and said shaft in a normal neutral relation, and means operating to guide and to limit the extent of such movement, said last-mentioned means including means associated with said shaft adapted on such movement to cause engagement of the driving and driven clutch means of one or the other of said clutch units as determined by the direction of rotation of said shaft.

6. An assemblage for the power steering of a motor vehicle comprising a rotatable worm-bearing sleeve operatively connectable to the steering elements of the vehicle and directly mounting a pair of spaced multi-disc clutch units slidable thereon, the driving discs of each said unit being rotatable relative to said sleeve, the driven discs being incapable of such relative rotation, power transmission means whereby the two sets of driving discs may be continuously rotated in opposite directions through a take-off from the motor of the vehicle, a steering shaft co-axial with said sleeve and terminating therewithin, said shaft being supported for simultaneous rotary and axial movement relative to said sleeve, a coil spring surrounding said shaft within said sleeve tending to resist such movement of said shaft and to maintain said sleeve and said shaft in a normal neutral relation, and means operating to guide and to limit the extent of such movement, said last-mentioned means including means associated with said shaft adapted on such movement to cause engagement of the driving and driven discs of one or the other of said clutch units as determined by the direction of rotation of said shaft.

7. An assemblage for the power steering of a motor vehicle comprising a rotatable, worm-bearing, cylindrical sleeve operatively connectable to the steering elements of the vehicle and directly mounting a pair of spaced multi-disc clutch units slidable thereon, the driving discs of each said unit being rotatable relative to said sleeve, the driven discs being incapable of such relative rotation, power transmission means whereby the two sets of driving discs may be continuously rotated in opposite directions through a take-off from the motor of the vehicle, said transmission means including a pair of gears each of which comprises helical teeth through which it mates with the other gear and spur teeth for directly driving one set of said driving discs, a cylindrical steering shaft co-axial with said sleeve and terminating therewithin, said shaft being supported for simultaneous rotary and axial movement relative to said sleeve, a coil spring surrounding said shaft within said sleeve tending to resist such movement of said shaft and to maintain said sleeve and said shaft in a normal neutral relation, and means operating to guide and to limit the extent of such movement, said last-mentioned means including a pin extending radially from said shaft through helical slots in said sleeve and mounting a pair of spacer elements which on such movement are adapted to bear against one or the other of said clutch units as determined by the direction of rotation of said shaft to cause engagement of the corresponding driving and driven discs.

References Cited in the file of this patent

UNITED STATES PATENTS

| Number | Name | Date |
|---|---|---|
| 2,311,010 | Vickers | Feb. 16, 1943 |